Sept. 25, 1951    B. W. BADENOCH    2,569,365
COOKING DEVICE
Filed June 4, 1946    5 Sheets-Sheet 1
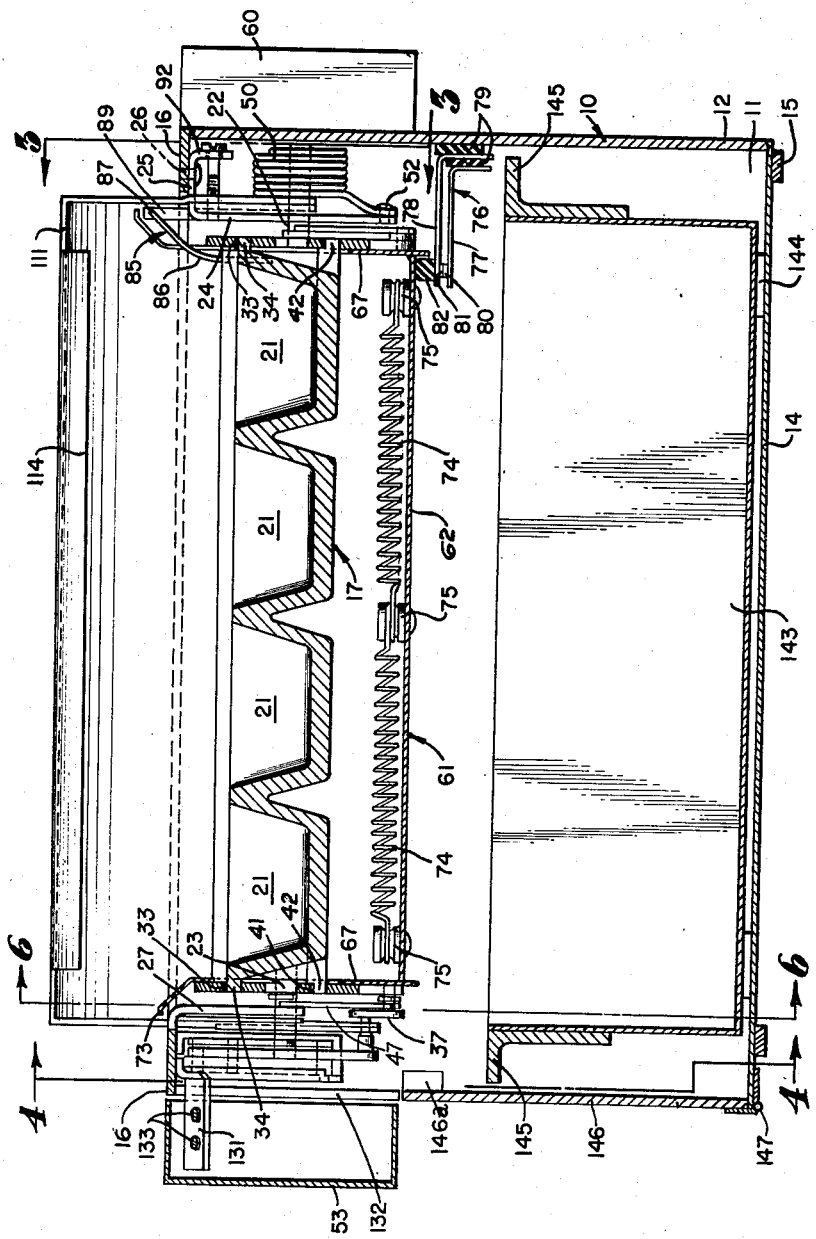
INVENTOR.
BENJAMIN WILSON BADENOCH
BY
ATTORNEY Sept. 25, 1951   B. W. BADENOCH   2,569,365
COOKING DEVICE
Filed June 4, 1946   5 Sheets-Sheet 2
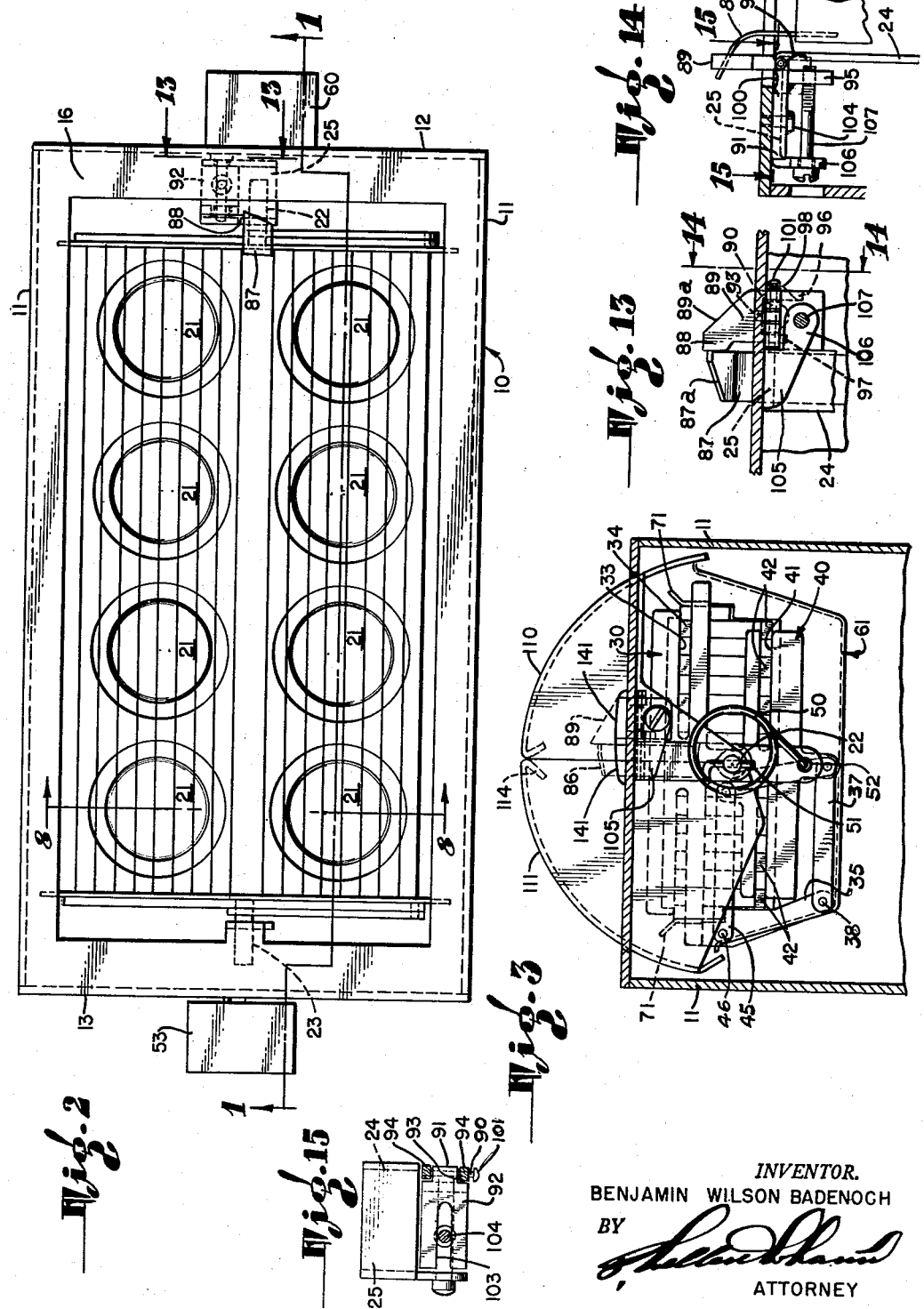
INVENTOR.
BENJAMIN WILSON BADENOCH
ATTORNEY Sept. 25, 1951 B. W. BADENOCH 2,569,365
COOKING DEVICE
Filed June 4, 1946 5 Sheets-Sheet 3

INVENTOR.
BENJAMIN WILSON BADENOCH
BY
ATTORNEY

Sept. 25, 1951     B. W. BADENOCH     2,569,365
COOKING DEVICE
Filed June 4, 1946     5 Sheets-Sheet 4
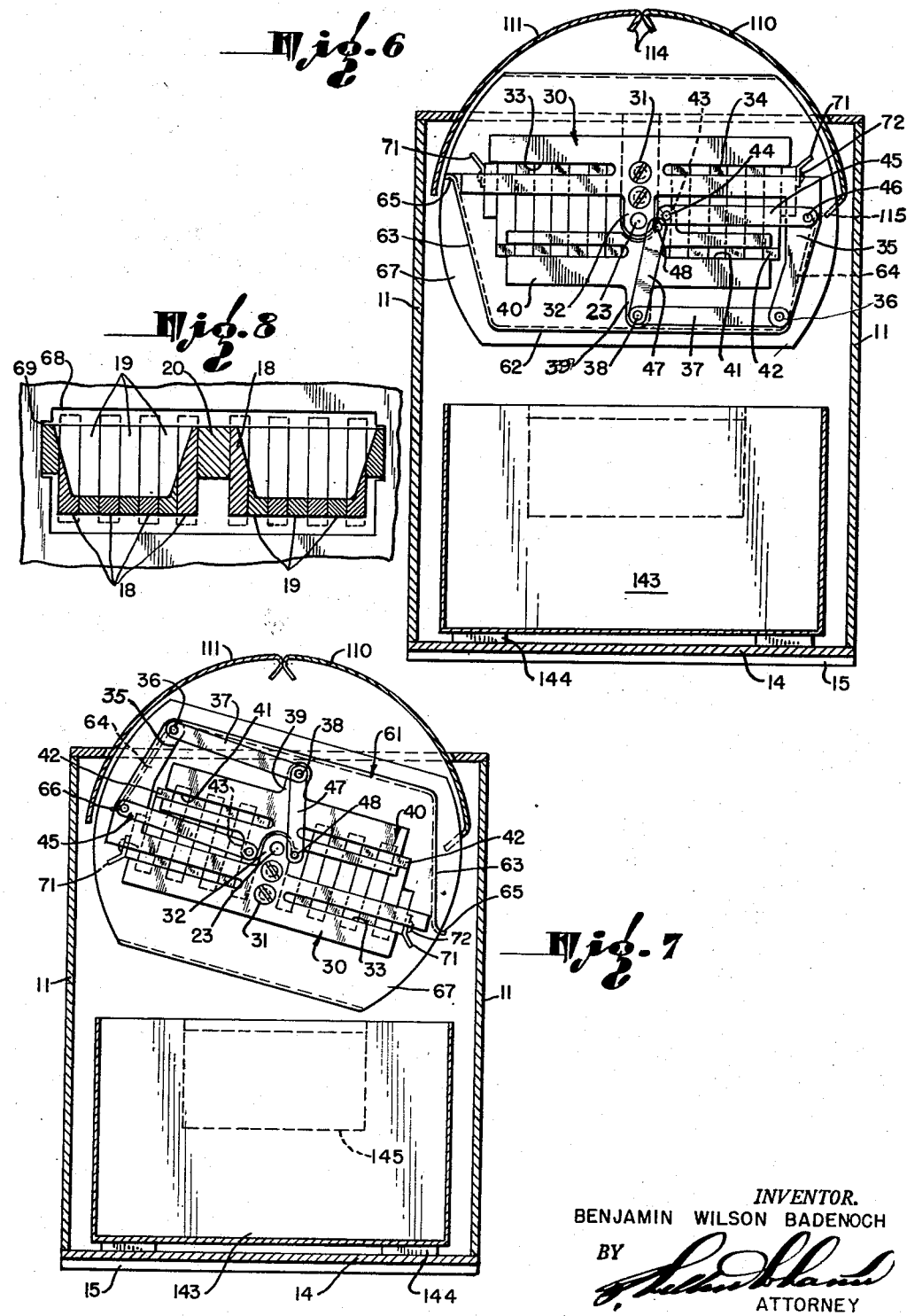
*INVENTOR.*
BENJAMIN WILSON BADENOCH
BY
ATTORNEY Sept. 25, 1951  B. W. BADENOCH  2,569,365
COOKING DEVICE
Filed June 4, 1946  5 Sheets-Sheet 5
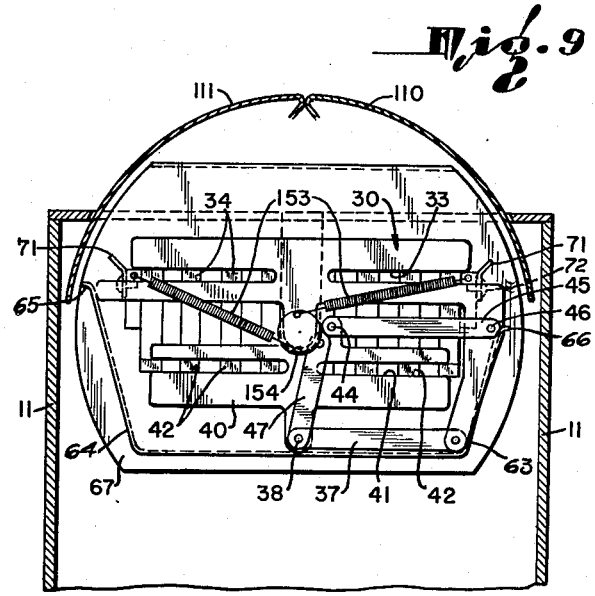
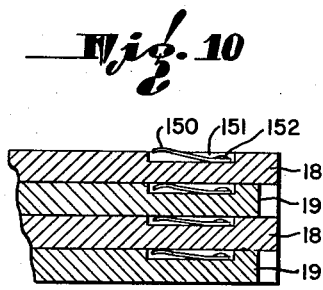
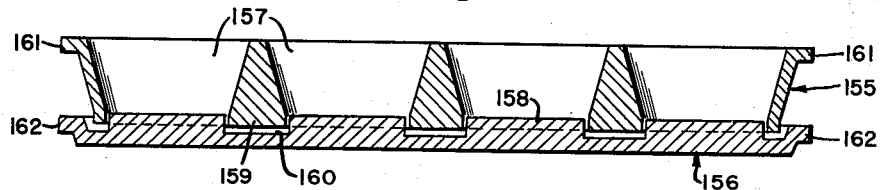
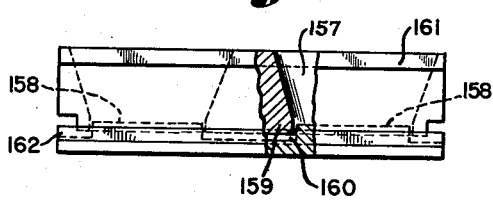
INVENTOR.
BENJAMIN WILSON BADENOCH
BY
ATTORNEY Patented Sept. 25, 1951

2,569,365

UNITED STATES PATENT OFFICE 2,569,365

COOKING DEVICE

Benjamin Wilson Badenoch, Los Angeles, Calif.

Application June 4, 1946, Serial No. 674,301

20 Claims. (Cl. 99—334)

This invention relates generally to cooking devices and more particularly to devices for cooking a prepared batter, dough or the like.

In preparing food from dough or batter there are a considerable number of manual steps required between the dough stage and the serving of the cooked product, such as biscuits, muffins and the like, in a warm condition, as is most desirable, and it is an object of the present invention to provide a device which will reduce the number of these manual operations or steps to a minimum.

It is another object of the invention to provide a device of this character which will automatically perform the steps or operations between the placing of the batter or dough into the heating member and the removal of the cooked product in a warmed condition for serving.

While the present invention has utility in preparation of various products, it is herein shown and described in connection with the preparation of baked muffins, biscuits and the like, and it is a further object of the invention to provide a device of this character in which the muffins or biscuits may be cooked after the batter or dough is placed in the cooking receptacle or mold member and from which the cooked product may be easily and finally loosened after it has been suitably baked.

Another object of the invention is to provide a device of this character which will automatically effect such loosening of the cooked product.

Still another object of the invention is to provide a device of this character which will automatically discharge the loosened product into a warmed compartment.

It is a further object of the invention to provide a device of this character wherein the heat from the baking mechanism is utilized to maintain a warming temperature in the warming oven or compartment.

A still further object of the invention is to provide a device of this character wherein the length of the cooking time is automatically controlled.

Another object of the invention is to provide a device of this character adapted for home use and of such size that it can be used on the dining table or the like, and which will occupy substantially the same table space as an ordinary serving tray occupies.

Still another object of the invention is to provide a device of this character which is relatively simple in construction and operation and is of relatively low cost.

While the present invention comprises a novel and useful combination of elements or parts, it is to be understood that some of the parts or elements are also separably novel and useful.

Further objects and advantages of the invention will be brought out in the following part of the specification.

Referring to the drawings which are for illustrative purposes only,

Fig. 1 is a longitudinal section of a cooking device embodying the present invention taken on the line 1—1 of Fig. 2;

Fig. 2 is a plan view of a device with the doors or covers removed;

Fig. 3 is a sectional view taken on the line 3—3 of Fig. 1 showing the cooking receptacle or mold actuating mechanism.

Fig. 6 is a sectional view taken on the line 6—6 of Fig. 1, showing the mechanism for actuating the cooking receptacle or mold elements;

Fig. 7 is a view similar to Fig. 6, but showing the receptacle in inverted position;

Fig. 8 is a section taken on the line 8—8 of Fig. 2;

Fig. 9 is a sectional view showing an alternative arrangement of the mold actuating mechanism for loosening the baked product;

Fig. 10 is a fragmentary section of the mold laminations and springs for separating said laminations of the arrangement shown in Fig. 9;

Fig. 11 is a sectional view of an alternative receptacle or mold arrangement.

Fig. 12 is an end view of the receptacle shown in Fig. 11;

Fig. 13 is a partial section taken on the line 13—13 of Fig. 2;

Fig. 14 is a section taken on the line 14—14 of Fig. 13; and

Fig. 15 is a view taken on line 15—15 of Fig. 14.

Figure 4:
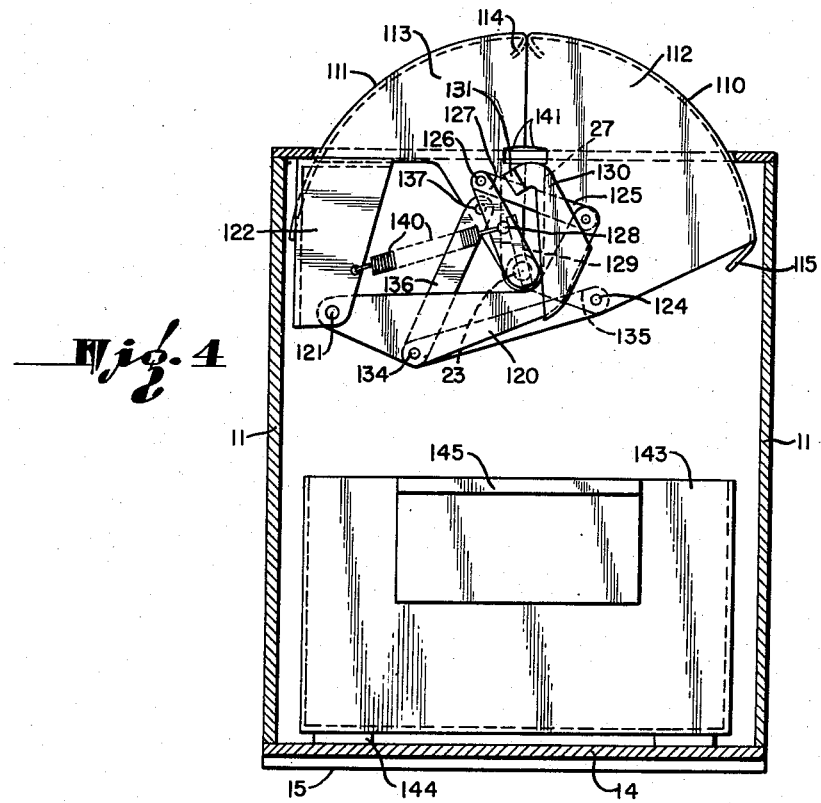
Fig. 4 is a sectional view taken on the line 4—4 of Fig. 1, showing the cover actuating mechanism per se, the cover being shown in closed position.

Referring to Fig. 1, the device comprises a housing, indicated generally at 10, and including side walls 11, and walls 12 and 13 respectively, and a bottom 14, to the underside of which are secured transversely extending members 15 for supporting the device in spaced relation to the top of a table or the like. About the margins of the upper end of the housing is a frame 16, which extends inwardly of the open upper end.

A cooking receptacle, indicated generally at 17, is disposed within the housing, adjacent the top thereof to provide a cooking surface or surfaces for dough or the like and, as shown, comprises a plurality of alternately arranged plates or laminations 18 and 19 respectively, disposed on opposite sides of a central longitudinally extending member 20. The receptacle may have a normally flat top or cooking surface, but is shown as having mold cavities 21 formed therein, in which dough or batter is placed, the mold walls providing the cooking surfaces.

The cooking receptacle is rotatably mounted relative to axially aligned shafts 22 and 23 at respective ends of said receptacle, as will be more fully described hereinafter. The shaft 22 is rotatably mounted in the down-turn portion 24 of a bracket 25, which is secured to the frame 16 by means of a rivet 26; and the shaft 23 is rotatably mounted in a down-turn ear 27, which is formed integrally with the adjacent end of the frame 16.

The plates or laminations 18 and 19 are slidable edgewise relative to each other, or laterally relative to the bottom cooking surface of the bottom of the mold cavities and generally laterally relative to the sides of said cavities; and means for thus moving said plates or laminations is provided. This means comprises a substantially horizontal member 30 at each end of the cooking receptacle and adjacent the top thereof, when the receptacle is in normal upright position as shown in Figs. 3 and 6. Each member 30 is secured to the member 20 by means of screws 31, and each of said members has a depending ear 32 having an opening adjacent the free end for reception of the respective shafts 22 and 23 which are fixed to said ears by soldering or other suitable means. Each of the members 30 also includes oppositely disposed longitudinally extending slots 33 in which are received lugs 34 extending longitudinally from the adjacent upper ends of the plates 19. Each member 30 also has an arm 35 depending from one end thereof having a pivotal connection, at 36, with a link 37 which is pivoted at 38 to a depending ear 39 of a lower actuating member 40.

Each member 40 also has oppositely disposed slots 41 in which are received lugs 42 extending longitudinally from the lower end portions of the plates 18, and each of said members 40 is provided with an upwardly extending ear 43 which has a pivotal connection 44 with a link 45 which has its opposite end pivoted at 46 to the arm 35. With this arrangement, the arm 35, links 37 and 45, and member 40 comprise a parallelogram which maintains the members 30 and 40 in substantially parallel relationship with each other. There is also a link 47 having one end pivoted at 38 and the other end pivoted to a pin 48 secured in the ear 27 adjacent the shaft 23. The pin 48 is spaced from the shaft 23 and located somewhat below the horizontal plane of the axis of said shaft.

With this arrangement, the set of plates 18 will have relative movement with respect to the set of plates 19 when the cooking receptacle is rotated or inverted to the position shown in Fig. 7. The first movement of said plates 18, as said receptacle is thus rotated, will be in a downward direction, said plates moving outwardly of the bottom of the receptacle. As the receptacle continues to rotate, the plates 18 will move in the opposite direction to a position wherein their top edges will extend beyond the plane of the top surfaces of the members 19. In this manner the muffins, biscuits or the like, which have been cooked in the molds 21, will be completely loosened, and when the receptacle is inverted as shown in Fig. 7, said muffins will drop from the molds. It is to be noted that when the plates 18 move downwardly, or in a direction to extend outwardly of the bottom of the receptacle, the cooking surfaces of said plates forming portions of the walls of the mold cavities 21 will have moved away from the adjacent surfaces of the product cooked therein, said product being held against movement in the same direction as the plates 18 by the mold cavity surfaces of the plates 19. When the plates 18 are moved in the opposite direction to their extreme limit of movement, the mold cavity surfaces of said plates will first reengage the respective surfaces of the cooked product and then, upon further movement, will lift said product away from the mold cavity surfaces of the plates 19. Thus, the cooked product is completely loosened from the mold surfaces and will drop by gravity from the mold cavities upon sufficient inversion of the receptacle.

Means for rotating the receptacle is provided and, as shown, comprises a spring 50 which is coiled axially about the shaft 22 and has an end portion 51 which is secured in a cross bore in said shaft 22 adjacent its free end. The opposite end of the spring extends outwardly of the coil thereof and is attached to the bracket 24, adjacent its free end, by means of a rivet 52. The spring 50 is a torsion spring and is adapted to rotate the receptacle from its upright position, shown in Figs. 3 and 6, to its inverted position as shown in Fig. 7.

Means for rotating the receptacle from the inverted position to its upright position comprises, as shown, a handle 53, the manner in which the handle actuates the mechanism being hereinafter described. If desired, a fixed handle 60 may be suitably attached to the opposite end of the casing 10 by any well known means such as screws, bolts or the like.

The device is provided with heating means which, as shown, comprises a heating shield or reflector indicated generally at 61, which is substantially U-shaped in cross section. The reflector includes a bottom 62 spaced from the bottom of the receptacle 17 and substantially parallel with said bottom. The sides 63 and 64 of the reflector diverge upwardly and have outwardly turned flanges 65 and 66 respectively along their free edges. At each end of the reflector is an end plate 67 which has arcuate sides and substantially parallel top and bottom edges, said end plates being secured to the reflector by any suitable means such as rivets, welding, soldering, or the like, not shown. Each end plate has an opening 68 therein for reception of the adjacent ends of the cooking receptacle or mold, and each opening is provided with an outwardly extending recess 69 in which is received the adjacent side plates 19 of the receptacle, these plates being narrower than the rest of the plates of the receptacle. Thus, the reflector is mounted on the receptacle and it is to be noted that the plates fit snugly enough in the recesses to prevent lateral separation of the plates and receptacle. The opening 69, however, is wide enough to permit the plates 18 to slide relative to the plates 19 in the manner hereinabove described. If desired, outwardly and upwardly inclined flanges 71 may be secured to the outer plates 19 along their upper edges by means of screws 72 or the like. These flanges prevent batter or the like from running over the sides of the receptacle.

The end plates 67 of the reflector may have outwardly turned flanges 73 adjacent their upper ends for a purpose which will be hereinafter described.

A heating element is provided within the reflector which is shown as comprising resistance coils 74 which are attached to insulators 75 secured to the bottom 62 of the reflector. The current to the coil may be automatically controlled, as by a switch indicated generally at 76, suitably located to be operably engaged and disengaged by the bottom 62 upon rotation of the receptacle and reflector assembly, as will be later described. The switch 76 comprises a pair of switch members 77 and 78 respectively, secured to the adjacent end wall 12 of the casing 10 by any suitable means such as screws, not shown, or the like, and suitably insulated from each other and from the end wall 12 by insulation strips 79. The switch member 77 is provided with a contact 80 engageable with a contact 81 on the switch member 78, the latter having a block of insulated material 82 secured thereto adjacent the free end thereof. The switch member 78 is flexible and will normally move the contact 81 away from the contact 80 of the switch member 77. This will occur when the cooking receptacle, together with the reflector, rotates to the inverted position. However, when the receptacle and reflector are righted, the bottom of the reflector will engage the block 82 and move the switch member 78 toward the switch member 77 and effect engagement of the contacts 80 and 81. Thus, the circuit for the heating coil is closed. It is to be understood of course, that the heating coil 74 has suitable connections with a source of power of proper character, and that the switch 76 is interposed in the circuit in any well known manner so as to control the current to the coil. Inasmuch as the circuit is conventional, the wires and details thereof are not shown.

Means for retaining the receptacle in the upright position is provided and comprises, as shown, a latch indicated generally at 85. The latch includes a bimetallic thermostatic member or strip 86 having one end secured within a slot or recess, not shown, in the central member 20 of the cooking receptacle. The thermostat strip extends upwardly and is curved outwardly, through a slot provided therefor in the adjacent end wall 67 of the reflector, to a position whereat its free end 87 is engageable with the outer surface of a projection 88 of a latch member 89. When the latch and thermostat are in engagement, the receptacle 17 is retained in its upright position. As the thermostat strip 86 becomes heated, the free end 87 thereof will move counterclockwise, as shown in Fig. 1, until it disengages from the adjacent end of the projection 88.

The latch member 89 is pivoted to a pin 90 mounted in a longitudinally extending ear 91 of a bracket plate 92, said latch member having a notch 93 therein, and the parts 94 of the latch member, defining the sides of the notch, straddle the ear 91. A member 95 is secured to the underside of the plate, by welding or the like, and is located adjacent the end of said plate to which the latch member is pivoted and provides means for limiting rotation of the latch member in a clockwise direction by forming an abutment for depending arms 96 and 97 of said latch member which is normally held in a substantially vertical position by a spring 98, which has one end 99 arranged to press against the extension 96. The spring is coiled about one end of the pin 90 and has the opposite end 100 engageable with the top of the bracket plate 92. It is to be noted that the head 101 of the pin 90 is spaced somewhat from the adjacent side of the extension 96 to provide space for the spring coils. The plate member 92 has a longitudinally extending slot 103 for slidable reception of a rivet 104 which secures said plate to the adjacent portion of the frame 16. The rivet holds the plate loosely enough to permit sliding action, and rotation of the plate on the rivet is prevented by the adjacent side of the bracket 25. The bracket 25 has a depending flange 105 with a laterally extending ear 106 which is spaced from the member 95 and is substantially parallel therewith. The ear 106 is provided with an opening in which is loosely received a screw 107 which is threaded into an opening provided therefor in the member 95. With this arrangement the latch member 89 is movable longitudinally and is adapted to carry the latch member 89 with it to variably position same with respect to the thermostatic end 87, to thereby control the temperature whereat the thermostat will disengage the latch and permit the torsion spring 50 to rotate the cooking receptacle or mold, together with its heat reflector 61. When the receptacle is righted with the thermostat temperature below the value whereat the free end 87 thereof will strike the latch member 89, the inclined edge 87a of said end 87 will engage an inclined edge 89a of said latch member and move it out of the path of said free end, said latch member pivoting on the pin 101 and returning to its normal upright position under the influence of the spring 98.

The device also is provided with a cover which, as shown, comprises a pair of arcuate members or doors 110 and 111 having generally segment-shaped end plates 112 and 113 respectively. The cover members 110 and 111 are pivoted for rotary movement between open and closed positions, shown in Figs. 4 and 5 respectively. End plates 112 and 113 close the ends of the respective covers and are in closely spaced relationship to the reflector flanges 73, to minimize loss of heat therebetween. The plates 112 and 113 have openings therein for pivotal reception of the shafts 22 and 23. These openings in said plates are located adjacent the radial centers of the cover members. Each cover member is provided with an inturned portion 114 along the abutting edge of said members when in closed position, adapted to be located closely adjacent to the flanges 71 of the receptacle when the cover members are open, to prevent batter or the like from being accidentally dropped inside the housing. The cover member 110 is provided with an inturned flange 115 along its opposite edge, in order to more completely enclose the receptacle, said flange extending toward the adjacent portion of the reflector and the edge of said flange being closely adjacent the flange 66 of said reflector when the cover is closed and the receptacle is upright. The flange 65 of the receptacle extends toward the adjacent portion of the cover member 111 when the device is in the last mentioned position.

The device also includes means for simultaneous movement of the cover members between open and closed positions and said means comprises a linkage system which also connects the cover members to the mechanism for rotating the receptacle as will be hereinafter pointed out. The linkage system includes an arm 120 which is pivoted adjacent one end to the pin 121 secured to a bracket 122 which is attached to the frame 16 by means of rivets or other suitable means not shown. The arm 120 has an angular extension 123, the free end of which is pivoted, at 124, to one end of a link 125 which has its opposite end pivoted at 126, to one end of a second link 127. The link 127 has its opposite end pivoted on the shaft 23 and intermediate the end of the link 127 is fixed a pin 128 which is engageable with the free end of a pin 129 fixed in an opening of said shaft 23 provided therefor.

From the extension 123 of the lever 120 there is an outwardly and upwardly turned arm 130 which has a laterally extending arm 131 projecting through an arcuate slot 132 in the adjacent wall 13 of the housing. The free end of the arm 131 is secured to the handle 53 by screws 133.

The lever 120 has a pin 134 secured therein intermediate its ends, on which levers 135 and 136 are pivoted adjacent their ends. The opposite end of the lever 135 is pivoted on a pin 137 fixed in the adjacent end plate of the right hand cover member as viewed in Figs. 4 and 5. The end plate of the other cover member is notched at 138, and the opposite end of the lever 136 is pivoted on a pin 139 fixed in the last mentioned end plate and each end plate is notched at 141 for reception of the ear 27, bracket 25 and plate 92, at the respective ends of the device. A spring 140 has one end secured to the bracket 122 and has its opposite end secured to the pin 128. This spring yieldingly urges the cover members together when they are in the closed position and serves another function described later.

Figure 5:
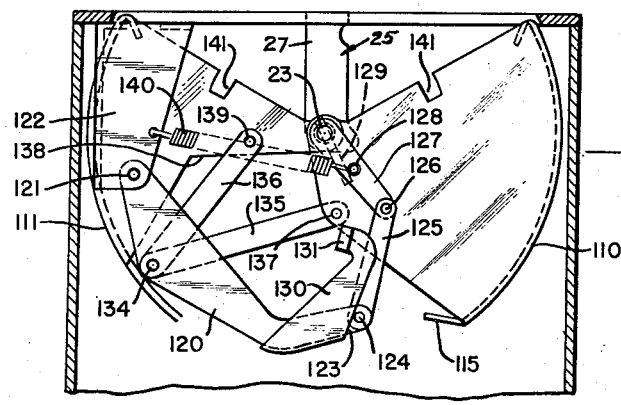
Fig. 5 is a partial section similar to Fig. 4, but showing the cover in open position.

With the foregoing linkage mechanism, the cover members may be moved simultaneously between the closed position shown in Fig. 4 and the open position shown in Fig. 5 with the parts assuming the positions shown for the respective open and closed positions of the cover members. When the covers are closed, opening of them may be effected by rotation of the handle 53 so as to cause the arm 130 and lever 120 to move in clockwise direction, said movement being limited by engagement of the arm 131 with the bottom end of the notch 132. This movement will cause the linkage system to open both of the cover members. As the covers are opened, the pin 128 will be carried by the lever 127 in clockwise direction from the position shown in Fig. 4 to the position shown in Fig. 5, during which movement the spring 140 will pass across the axis of the shaft 23 and urge the covers in the opening direction.

It is to be understood that when the pin 129 is in the position shown in Fig. 5, the receptacle 17 is in the upright position whereat it is secured by the latch 85, and when the receptacle is in the inverted position the pin 129 will be in the position shown in Fig. 4, the engagement of pin 129 with pin 128 limiting rotative movement of the receptacle imparted or urged by spring 50. Now, when the handle 53 is rotated to open the covers, the pin 128 will move in the clockwise direction, with the lever 127, and cause clockwise movement of pin 129 which will result in movement of the receptacle to the upright position whereat it will be latched. Due to the fact that the pins 128 and 129 have a one way connection with each other, the covers may be closed after the receptacle has been latched, without imparting any movement to said receptacle or affecting its position, and when the covers are in the closed position the receptacle may invert without effecting movement of said covers.

A serving tray 143 is disposed beneath the cooking receptacle for reception of the cooked products. These products are deposited in the tray upon inversion of the receptacle. As shown, the tray 143 is positioned within the housing and is provided with legs 144 adjacent each corner, and has handles 145 adjacent the ends. The housing wall 13 is provided with a door 146 hinged at 147 along its bottom edge, there being recesses 146a in the adjacent side walls of the housing, behind the door edges to provide means for opening said door.

When using the device, the cooking receptacle may be preheated before the batter or dough is placed in the mold cavities. This preheating has several advantages. For example, the cooking time is reduced, the batter is prevented from penetrating any of the cracks between the laminations or plates 18 and 19, and the tendency of the batter to stick is materially reduced, particularly when metal having high heat conductivity is used for the receptacle, such as aluminum or its alloys. Such metal conducts the heat rapidly to areas contacted with the batter, and cooks a skin on the batter very rapidly so that there is no chance for the batter to get down into pores and weld itself into the surface. It has also been found advantageous to use a receptacle of the above noted material with a coating or plating of chrome.

After the device is plugged in, the cooking receptacle is righted so that the coil 74 will commence to heat up and the cover members then closed. When the receptacle reaches the predetermined temperature set by adjustment of the latch relative to the bimetallic thermostat, the latch will release and said receptacle will automatically invert, as hereinabove described, and will automatically shut off the current. The receptacle is then righted again, the covers, of course, being simultaneously opened. The spring 140, when the cover members and receptacle are thus positioned, hold said parts from opposite movement against the force of spring 50 so that the batter or dough may be poured or placed in the mold cavities.

Contact of the batter with the mold cavity surfaces cools the receptacle sufficiently so that the thermostat will engage the latch member and permit the cover members to be closed without having the receptacle invert again until sufficient heat has been added thereto to cook the batter. When the batter has been sufficiently cooked, the latch releases and the torsion spring 50 inverts the receptacle. During this inversion of the receptacle, the laminations or plates 18 and 19 thereof are given their relative movement, as has been already described, thereby effecting release of the cooked product so that when the receptacle has rotated sufficiently, said product drops therefrom and falls into the tray 143.

The cooked products may be left in the tray until the time they are to be served, and the heat retained by the receptacle and associated parts will maintain said products in a suitably warmed condition.

Any crumbs or the like which may be in or upon the cooking receptacle will drop into the tray when said receptacle is inverted.

Referring to Figs. 9 and 10, there is shown an alternative arrangement of the device wherein the receptacle plates 18 and 19 have sliding action relative to each other, and are also separated laterally by springs 150 which are located in recesses 151 in the sides of the respective plates. One end of each spring 150 is secured to the bottom of the recess by any suitable means, such as a screw 152, and the free end of each spring is slightly curved and normally extends outwardly of the plane of the adjacent plate surface.

The plates are held together in side by side engagement by a pair of springs 153. Each spring 153 has one end secured to the outermost receptacle plate, and the inner end of each of said springs is secured to an annular member 154. When the receptacle is in the upright position, the last mentioned ends of the springs 153 are in substantially the same vertical plane, and said springs 153 exert maximum compressive pressure on the cooking receptacle. Upon inversion of the receptacle, which may be effected in the manner already described, the distance between the points of attachment of the respective springs decreases so that said springs exert a reduced compressive force on the receptacle plates, thereby permitting the springs 150 to effect separation.

When the receptacle reaches its fully inverted position, the points of attachment of the springs 153 have again separated and said springs will cause the receptacle plates to be moved toward each other. The above described movements of said plates will cause loosening of the product baked in the mold cavities so that when the receptacle has been inverted to its limit of movement, the said cooked products will drop into the tray as hereinabove described.

A still further alternative arrangement of the receptacle is shown in Figs. 11 and 12. The receptacle comprises two parts, an upper part 155 and a lower part 156. The upper part 155 has mold cavities 157 formed therein, and the lower part 156 has projections 158 formed to extend into the bottom of the mold cavities 157. The lower parts of the walls 159 of the mold cavities are received in the spaces 160 between the projections 158. The member 155 has lugs 161 projecting longitudinally from the adjacent corners, and the member 156 has similar lugs 162. The lugs 161 are received in the slots 33 of the member 30, and the lugs 162 are received in the slots 41 of the members 40. The parts of the receptacle are disposed in substantially the relationship shown in Fig. 11 and upon inversion of the mold or receptacle the bottom member 156 is moved relative to the upper member 155, causing the surfaces of the portions 158 to break away from the bottom of the product being cooked in the mold cavities and subsequently to cause said portions 158 to reengage the bottom of the cooked product in the mold cavities and to force said products outwardly relative to said mold cavities 157. The products are deposited into the serving tray as hereinabove described.

I claim:

1. In a cooking device, the combination of: receptacle means comprising a plurality of plates in side by side slidable relationship, having mold cavities therein for reception of material to be cooked; means for connecting alternate plates together in sets; and means for effecting relative sliding movement of the sets of plates toward and away from the surfaces of the mold cavities, first in one direction for effecting loosening of the cooked product in the mold cavities from the adjacent surfaces of one set of plates and then in the opposite direction for loosening the surfaces of the cooked product from the other set of plates.

2. In a cooking device, the combination of: receptacle means comprising a plurality of relatively movable parts fitting together to form a cooking surface; means for effecting relative movement of said parts to loosen the surface of the product on the cooking surface first from one of the parts and then from the other; means pivotally mounting the parts as a unit for inversion of the receptacle means for effecting inversion of the receptacle simultaneously with the movement of said parts; and timing means for instituting said movements of the parts and receptacle after a predetermined cooking time has elapsed.

3. In a cooking device, the combination of: receptacle means comprising a plurality of plates in side by side slidable relationship, having mold cavities therein for reception of material to be cooked; means for inverting said receptacle; means for effecting relative edgewise sliding movement of alternate plates in sets, said relative sliding movement being first in one direction for effecting loosening of the cooked product in the mold cavities from the adjacent surfaces of one set of plates and then in the opposite direction for loosening the surfaces of the cooked product from the other set of plates; means so constructed and arranged as to effect said sliding movements of the plates upon inversion of the receptacle.

4. The invention defined by claim 3, wherein there is a manually operated cover; and means connecting the cover and receptacle, said means being so constructed and arranged that opening of the cover will effect movement of the receptacle from an inverted to an upright position while permitting reverse movement of said receptacle without effecting opening of the cover.

5. In a cooking device, the combination of: a housing; a receptacle within the housing comprising a plurality of plates in side by side relationship, said plates being slidable edgewise relative to each other and being shaped to form mold cavities for reception of material to be cooked, said receptacle being rotatable on a horizontal axis; spring means for rotating the receptacle from an upright to an inverted position; means for connecting alternate plates together in sets whereby the plates of one set have edgewise movement relative to the plates of the other set; link means for retaining the side edges of one set of plates parallel with the side edges of the other set of plates at all times; a link having one end pivotally connected to the plate-connecting means and its opposite end connected to a pivot offset from the axis of the receptacle; a pair of cover members pivotally mounted for rotation about the axis of the receptacle; means for simultaneously moving the cover members between open and closed positions; a handle for manually actuating the last mentioned means; connecting means so constructed and arranged that the receptacle is moved from an inverted to an upright position when the covers are moved from closed to open position, said connecting means also being adapted to permit the covers to be closed without imparting movement to the receptacle and the receptacle to be rotated from the upright to the inverted position without movement of the covers when the latter are closed.

6. In a cooking device, a housing, a receptacle in the upper part of the housing formed by relatively movable parts fitting together to hold batter to be cooked, means for heating the parts to cook the batter, means for moving the parts relative to each other toward and away from the batter to loosen the cooked batter therefrom, means pivotally mounting the receptacle for tilting movement about a horizontal axis in the housing whereby the loosened cooked batter will fall therefrom by gravity, and means in the lower part of the housing to receive and hold the cooked batter.

7. In a cooking device, an open topped housing, a receptacle in the upper part of the housing for articles to be cooked, means mounting the receptacle in the housing for movement from a cooking position to a discharge position to discharge cooked articles therefrom, a swingable cover for the housing movable between open and closed positions, and cooperating parts on the receptacle and the cover to close the space between them when the cover is open and the receptacle is in its cooking position to prevent ingress of foreign matter into the housing.

8. In a cooking device, a plurality of sets of elongated strips interfitting to form a cooking surface, the strips of each set being connected adjacent their ends and alternating with the strips of the other sets, and means for moving the sets relative to each other in a direction generally normal to the cooking surface relative to the other sets successively to loosen a cooked article from the strips of the sets.

9. In a cooking device, a plurality of sets of elongated strips interfitting to form a cooking surface, the strips of each set being connected adjacent their ends and alternating with the strips of the other sets, and means for moving the sets relative to each other to produce successive movements of the sets away from the cooking surface thereby completely to loosen a cooked article from the cooking surfaces.

10. In a cooking device, a plurality of sets of elongated strips interfitting to form a cooking surface, the strips of each set being connected adjacent their ends and alternating with the strips of the other sets, means mounting the sets for tilting movement as a unit to discharge a cooked article from the cooking surface, and means operable simultaneously with tilting of the sets to move the sets relative to each other first in one direction and then in the other toward and away from the cooking surface to loosen a cooked article therefrom.

11. A cooking device comprising an open topped housing, a receptacle for batter to be cooked pivotally mounted on a horizontal axis for tilting between upright and inverted positions in the upper part of the housing, a movable cover for the open top of the housing, means in the housing and operable when the cover is in its closed position controlling tilting of the receptacle from its upright to its inverted position, and mechanism including a lost motion connection connecting the cover to the receptacle to move the receptacle to its upright position when the cover is opened the lost motion connection allowing the receptacle to move to its inverted position when the cover is closed.

12. A cooking device comprising an open topped housing, a receptacle for batter to be cooked pivotally mounted on a horizontal axis for tilting between upright and inverted positions in the upper part of the housing, a movable cover for the open top of the housing, a spring in the housing urging the receptacle to its inverted position, a latch to hold the receptacle in its upright position and releasable to permit the receptacle to move to its inverted position, and mechanism including a lost motion connection connecting the cover to the receptacle to move the receptacle to its upright position when the cover is opened the lost motion connection allowing the receptacle to move to its inverted position when the cover is closed.

13. A cooking device comprising an open topped housing, a receptacle for batter to be cooked pivotally mounted on a horizontal axis for tilting between upright and inverted positions in the upper part of the housing, a movable cover for the open top of the housing, heating means in the housing to heat the receptacle, a spring connected to the receptacle and urging it to its inverted position, a thermostatic latch to hold the receptacle in its upright position and responsive to the temperature of the receptacle to release when the receptacle reaches a predetermined temperature, and mechanism including a lost motion connection connecting the cover to the receptacle to move the receptacle to its upright position when the cover is opened the lost motion connection allowing the receptacle to move to its inverted position when the cover is closed.

14. In a cooking device, a receptacle comprising a plurality of plates fitting together in side by side relationship to define a cooking surface, means interconnecting alternate plates at their ends into sets, and control mechanism for moving the plates relative to each other first in one direction and then in the other along lines toward and away from the cooking surface.

15. A cooking device comprising a housing, a receptacle mounted in the housing for pivoting on a horizontal axis from an upright cooking position to an inverted ejecting position, automatic means to control movement of the receptacle from its upright to its inverted position, a cover pivoted on the housing to close the top thereof, operating means to swing the cover to its open position, and a lost motion connection from the operating means to the receptacle to move the receptacle to its upright position when the operating means is actuated to open the cover and to allow the cover to be closed with the receptacle in its upright position.

16. The construction of claim 15 in which the receptacle is formed of a plurality of relatively movable parts slidably fitting together and cooperating cam parts on the housing and the receptacle to move the parts relative to each other first in one direction and then in the other as the receptacle moves from its upright to its inverted position.

17. A cooking device comprising a receptacle formed by a plurality of members fitting together and shaped to define a cooking surface, means connecting the members for movement relative to each other first in one direction and then the other along lines toward and away from the cooking surface, a support mounting the receptacle as a unit for rotation about a horizontal axis between upright and inverted positions, means to rotate the receptacle from its upright to its inverted position, and connections between the support and the members to effect said relative movement of the members upon pivotal movement of the receptacle between its upright and inverted positions.

18. A cooking device comprising a receptacle formed by a plurality of members fitting together and shaped to define a cooking surface, means connecting the members for relative lateral movement generally parallel to said surface, first resilient means urging the members laterally away from each other, second resilient means connected to the members urging them toward each other, a support mounting the receptacle as a unit for pivotal movement about a horizontal axis between upright and inverted positions, means to rotate the receptacle between said upright and inverted positions, and a device connecting the second resilient means to the support and so constructed and arranged that when the receptacle is in certain positions the second resilient means will overcome the force of the first resilient means and when the receptacle is in other positions the force of the second resilient means will be insufficient to overcome the force of the first resilient means.

19. The construction of claim 17 in which one member is formed with mold cavities open at the top and bottom and the other member includes portions forming bottoms for the mold cavities, said members having such movement relative to each other as to cause the bottom portions to move inwardly and outwardly with respect to the mold cavities.

20. A cooking device comprising a receptacle formed by a plurality of parts fitting together and so shaped as to define an open topped cavity to receive batter to be cooked, means for heating the receptacle to cook batter in the cavity, a frame on which the parts are mounted for movement relative to each other in directions toward and away from the surface of the cavity, means to effect relative movement of the parts first in one direction and then in the other to loosen the cooked batter from the surfaces of the parts defining the cavity, a support on which the frame is pivoted on a horizontal axis, and means to turn the frame on the support to invert the cavity so that the cooked article can fall therefrom.

BENJAMIN WILSON BADENOCH.

REFERENCES CITED

The following references are of record in the file of this patent:

UNITED STATES PATENTS

| Number | Name | Date |
|---|---|---|
| 480,469 | June | Aug. 9, 1892 |
| 746,971 | Marchiony | Dec. 15, 1903 |
| 1,007,200 | Hissdorfer | Oct. 31, 1911 |
| 1,207,852 | Burger | Dec. 12, 1916 |
| 1,462,105 | Hart | July 17, 1923 |
| 1,512,674 | Campbell | Oct. 21, 1924 |
| 1,594,190 | Barnard | July 27, 1926 |
| 1,720,800 | Morrison | July 16, 1929 |
| 1,978,872 | Wharton | Oct. 30, 1934 |
| 1,984,027 | Lyons | Dec. 11, 1934 |
| 2,038,361 | Hawes | Apr. 21, 1936 |
| 2,057,741 | Purpura | Oct. 20, 1936 |
| 2,106,009 | Lee | Jan. 18, 1938 |
| 2,112,358 | Cretors | Mar. 29, 1938 |
| 2,134,682 | Burch | Nov. 1, 1938 |
| 2,179,468 | Delf | Nov. 7, 1939 |
| 2,194,859 | Malmquist et al. | Mar. 26, 1940 |
| 2,270,327 | Mills et al. | Jan. 20, 1942 |
| 2,465,577 | Cox | Mar. 29, 1949 |

FOREIGN PATENTS

| Number | Country | Date |
|---|---|---|
| 454,824 | Great Britain | Oct. 2, 1936 |